(12) United States Patent
Watanabe et al.

(10) Patent No.: US 10,467,789 B2
(45) Date of Patent: Nov. 5, 2019

(54) IMAGE PROCESSING DEVICE FOR VEHICLE

(71) Applicant: AISIN SEIKI KABUSHIKI KAISHA, Kariya-shi, Aichi-ken (JP)

(72) Inventors: Kazuya Watanabe, Anjo (JP); Yu Tanaka, Nagoya (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 152 days.

(21) Appl. No.: 15/593,909

(22) Filed: May 12, 2017

(65) Prior Publication Data
US 2017/0352176 A1   Dec. 7, 2017

(30) Foreign Application Priority Data

Jun. 6, 2016   (JP) .................................. 2016-112943

(51) Int. Cl.
*G06T 11/60*  (2006.01)
*B60R 1/00*  (2006.01)
(Continued)

(52) U.S. Cl.
CPC ................ *G06T 11/60* (2013.01); *B60R 1/00* (2013.01); *B60R 16/0239* (2013.01); *B60T 7/12* (2013.01); *B60T 7/22* (2013.01); *B62D 15/021* (2013.01); *B62D 15/027* (2013.01); *B62D 15/0275* (2013.01); *G06T 3/005* (2013.01); *B60K 2370/1438* (2019.05); *B60K 2370/152* (2019.05); *B60K 2370/155* (2019.05); *B60K 2370/1531* (2019.05); *B60K 2370/173* (2019.05); *B60K 2370/21* (2019.05); *B60K 2370/31* (2019.05); *B60K 2370/334* (2019.05); *B60K 2370/52* (2019.05); *B60R 2300/105* (2013.01); *B60R 2300/20* (2013.01);
(Continued)

(58) Field of Classification Search
None
See application file for complete search history.

(56) References Cited

U.S. PATENT DOCUMENTS 8,868,329 B2 * 10/2014  Ikeda ..................... G01C 21/00
                                                                701/33.4
9,558,411 B1 *  1/2017  Ferguson ........... G06K 9/00818
(Continued)

FOREIGN PATENT DOCUMENTS

JP     2006-253872 A    9/2006
WO    2012/017560 A1   2/2012

*Primary Examiner* — Kevin Ky
(74) *Attorney, Agent, or Firm* — Sughrue Mion, PLLC

(57) ABSTRACT

An image processing device for a vehicle includes: an acquisition unit acquiring a captured image of a periphery of a vehicle, which is captured by an imaging unit provided in the vehicle; a bird's eye view image generating unit generating a bird's eye view image in which the captured image is projected to a 3D virtual projection plane provided at a side opposite to the vehicle with reference to a ground and separated from the ground with distance from the vehicle; a guide line generating unit generating a guide line indicating a predicted course of the vehicle; a conversion unit converting the guide line into a virtual guide line indicating the predicted course on the virtual projection plane; and a superimposing unit superimposing the virtual guide line on the bird's eye view image.

6 Claims, 11 Drawing Sheets

(51) Int. Cl.
*B60R 16/023* (2006.01)
*B60T 7/12* (2006.01)
*B62D 15/02* (2006.01)
*G06T 3/00* (2006.01)
*B60T 7/22* (2006.01)

(52) U.S. Cl.
CPC ... *B60R 2300/301* (2013.01); *B60R 2300/303* (2013.01); *B60R 2300/305* (2013.01); *B60R 2300/607* (2013.01); *B60R 2300/806* (2013.01); *B60R 2300/8033* (2013.01); *B60T 2201/022* (2013.01); *B60T 2201/10* (2013.01); *B60T 2210/32* (2013.01)

(56) References Cited

U.S. PATENT DOCUMENTS

| | | | |
|---|---|---|---|
| 2008/0312942 A1* | 12/2008 | Katta | G06Q 10/04 705/7.34 |
| 2009/0122140 A1* | 5/2009 | Imamura | B60Q 9/005 348/148 |
| 2010/0164983 A1* | 7/2010 | Lawrence | G06T 15/00 345/611 |
| 2012/0113261 A1* | 5/2012 | Satoh | B60R 1/00 348/148 |
| 2012/0249521 A1* | 10/2012 | Sakurai | G06T 11/001 345/419 |
| 2012/0257058 A1* | 10/2012 | Kinoshita | G06T 3/0012 348/148 |
| 2013/0141547 A1 | 6/2013 | Shimizu | |
| 2013/0181982 A1* | 7/2013 | Tasaki | B60K 35/00 345/419 |
| 2014/0139640 A1* | 5/2014 | Shimizu | G06K 9/00791 348/46 |
| 2014/0152774 A1* | 6/2014 | Wakabayashi | G08G 1/168 348/46 |
| 2014/0293001 A1* | 10/2014 | Yu | B62D 15/027 348/36 |
| 2015/0097954 A1* | 4/2015 | An | B60R 1/00 348/148 |
| 2017/0096106 A1* | 4/2017 | Higuchi | B60R 1/00 |
| 2017/0132482 A1* | 5/2017 | Kim | G08G 1/168 |

* cited by examiner

IMAGE PROCESSING DEVICE FOR VEHICLE

CROSS REFERENCE TO RELATED APPLICATIONS

This application is based on and claims priority under 35 U.S.C. § 119 to Japanese Patent Application 2016-112943, filed on Jun. 6, 2016, the entire contents of which are incorporated herein by reference.

TECHNICAL FIELD

This disclosure relates to an image processing device for a vehicle.

BACKGROUND DISCUSSION

In the related art, there has been known an image processing device that generates image data in which a captured image is projected onto a three-dimensional object, converts the image data into an image viewed from a set point of view, and outputs the image as an output image. See, e.g., JP 2006-253872A (Reference 1) and WO 2012/017560 (Reference 2).

In this type of image processing device, for example, it is meaningful that a position of an object included in an output image is more easily recognized.

SUMMARY

An image processing device for a vehicle according to an aspect of this disclosure includes: an acquisition unit that acquires a captured image of a periphery of a vehicle, which is captured by an imaging unit provided in the vehicle; a bird's eye view image generating unit that generates a bird's eye view image in which the captured image is projected to a 3-dimensional ("3D") virtual projection plane that is provided at a side opposite to the vehicle with reference to a ground and separated from the ground with distance from the vehicle; a guide line generating unit that generates a guide line that indicates a predicted course of the vehicle; a conversion unit that converts the guide line into a virtual guide line that indicates the predicted course of the vehicle on the virtual projection plane; and a superimposing unit that superimposes the virtual guide line on the bird's eye view image.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
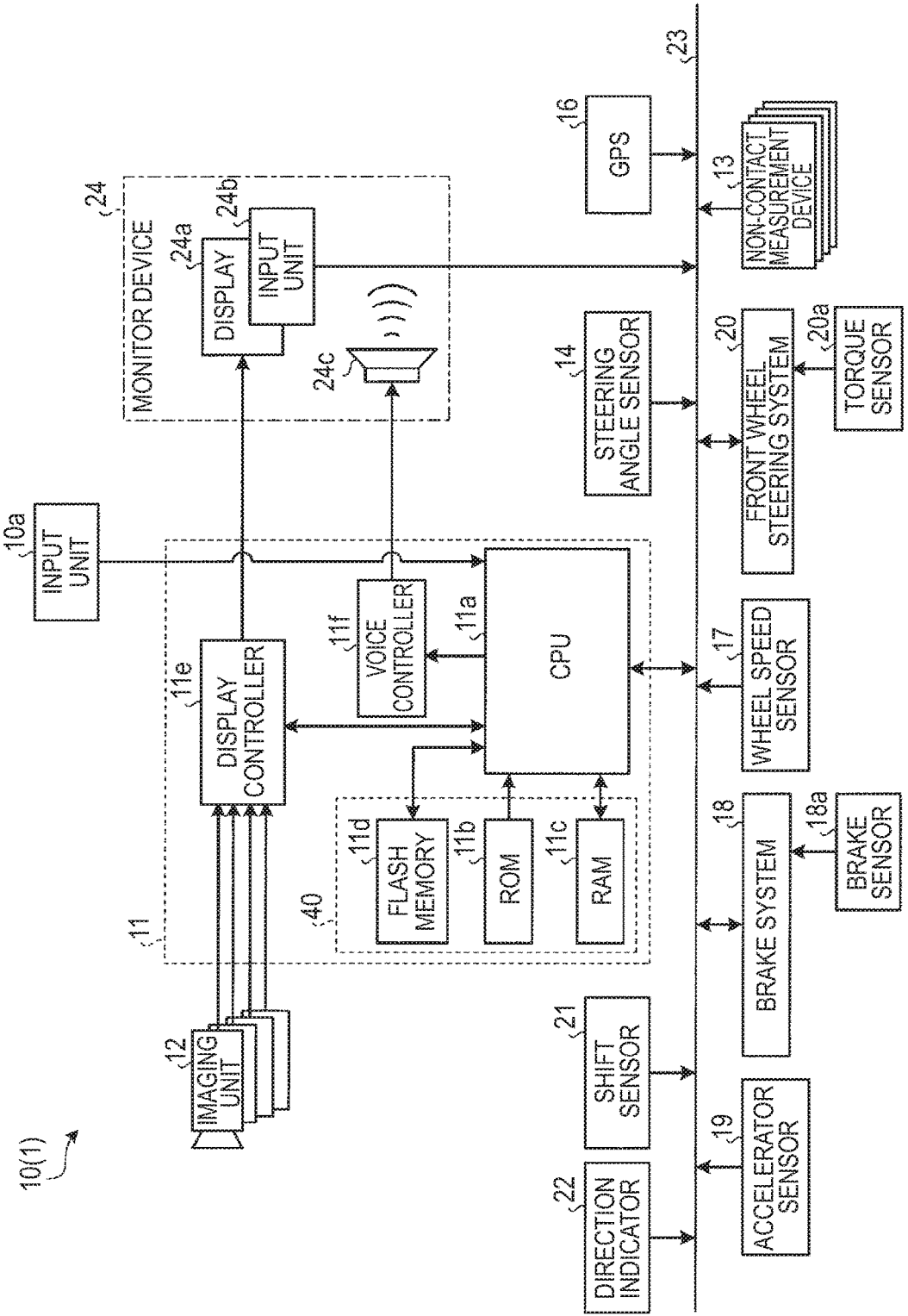
FIG. 1 is an exemplary schematic diagram of an image display system according to a first embodiment.

Hereinafter, exemplary embodiments disclosed here will be disclosed. Components of the embodiments illustrated below, and actions, results, and effects caused by the corresponding components are examples. The embodiments disclosed here may be implemented even by components other than the components disclosed in the embodiment given below. Further, according to the embodiments disclosed here, at least one of various effects and derivative effects acquired by the components may be acquired.

The same components are included in the embodiments and the examples disclosed below. Hereinafter, like reference numerals will be denoted by like elements and a duplicated description will be omitted.

(First Embodiment)

FIG. 1 is an exemplary schematic diagram of an image display system according to a first embodiment. As illustrated in FIG. 1, an image display system 10 provided in a vehicle 1 includes an electronic control unit (ECU) 11. The ECU 11 image-processes a captured image captured by an imaging unit 12 to generate an output image. The ECU 11 controls a display 24*a* to display the output image. The ECU 11 is one example of an image processing device or a display controller.

The image display system will be described. The image display system 10 displays an output image according to a situation of the vehicle 1. The image display system 10 may be embedded in a system that uses the output image for controlling the vehicle 1, for example, a driving assistance system or a parking assistance system.

As illustrated in FIG. 1, an apparatus or an electric component included in the image display system 10 is connected electrically or communicably through, for example, an in-vehicle network 23. The apparatus or the electric component is, for example, a non-contact measurement device 13, a steering angle sensor 14, a GPS 16, a wheel speed sensor 17, a brake sensor 18a, an accelerator sensor 19, a torque sensor 20a of a front wheel steering system 20, a shift sensor 21, a direction indicator 22, and an input unit 24b. The in-vehicle network 23 is, for example, a controller area network (CAN). Further, each electric component may be connected electrically or communicably through a network other than the CAN.

The imaging unit 12 is a digital camera having an imaging device such as a charge coupled device (CCD) or a CMOS image sensor (CIS) embedded therein. The imaging unit 12 may output image data, that is, moving picture data at a predetermined frame rate.

Figure 2:
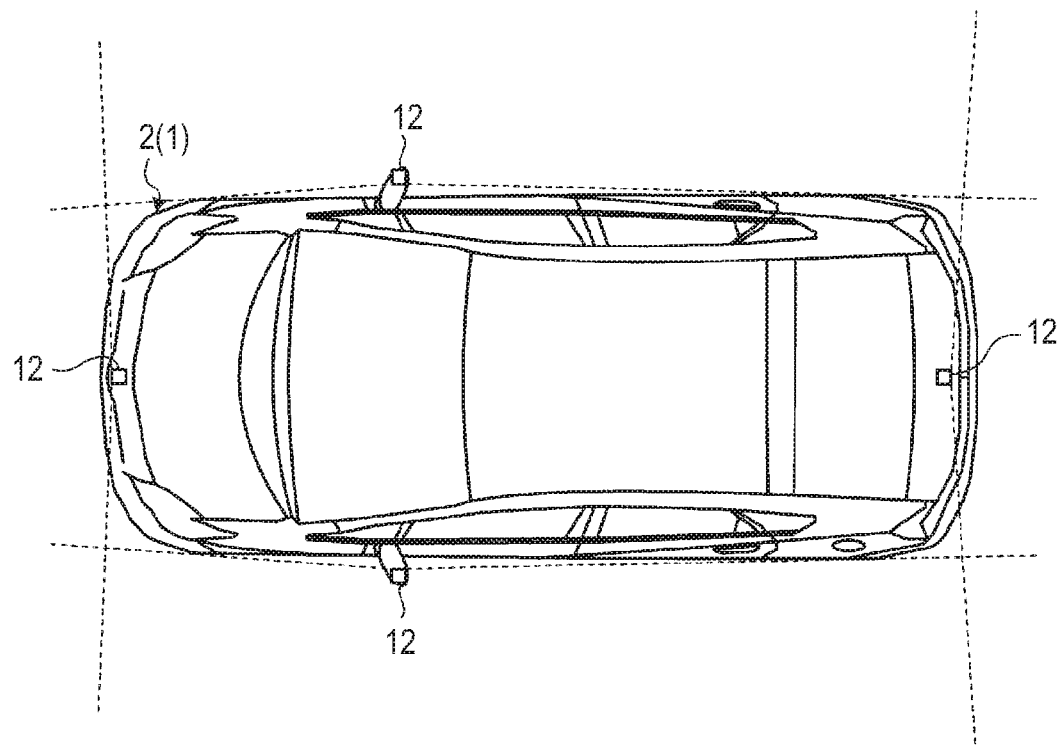
FIG. 2 is a plan view illustrating one example of an imaging range by an imaging unit of the image display system according to the first embodiment.

FIG. 2 is a plan view illustrating one example of an imaging range by the imaging unit 12. As illustrated in FIG. 2, in a vehicle body 2, the imaging unit 12, which images an outside of the vehicle, is provided in each of a front part, a right part, a left part, and a rear part of the vehicle body 2. The imaging unit 12 provided in the front part of the vehicle body 2 is installed at, for example, a front grill. The imaging units 12 provided on the left and right sides of the vehicle body 2 are installed at, for example, door mirrors, respectively. The imaging unit 12 provided in the rear part of the vehicle body 2 is installed at, for example, a rear hatch. Further, although not illustrated, the imaging unit 12 may be provided at, for example, each of the left and right corners of the rear end of the vehicle body 2. The imaging unit 12 is, for example, a wide-angle lens or a fish-eye lens. The imaging unit 12 acquires data of a captured image of the periphery of the vehicle body 2 (vehicle 1). Further, three or less imaging units 12 or five or more imaging units 12 may be provided. In addition, the imaging range of each of plural imaging units 12 may vary.

The non-contact measurement device 13 is, for example, a sonar or a radar that irradiates ultrasonic waves or radio waves so as to acquire reflection waves thereof. The ECU 11 may measure whether an obstacle positioned around the vehicle 1 exists or a distance up to an obstacle by a detection result of the non-contact measurement device 13. That is, the non-contact measurement device 13 is also called an object detecting unit or a distance measuring unit.

The steering angle sensor 14 is a sensor that detects a steering amount of a handle (not illustrated) as a steering unit and is constituted by using, for example, a hall device, and the like.

The global positioning system (GPS) 16 may acquire a current position based on radio waves received from an artificial satellite.

The wheel speed sensor 17 is a sensor that detects a rotational amount of the vehicle wheel or the number of revolutions per unit time and is constituted by, for example, the hall device, and the like. The ECU 11 may calculate a movement amount of the vehicle 1 based on data acquired from the wheel speed sensor 17. The wheel speed sensor 17 may be installed in a brake system 18.

The brake system 18 is an anti-lock brake system (ABS) that suppresses the lock of a brake, a side slip preventing apparatus (electronic stability control (ESC)) that suppresses a side slip of the vehicle 1 during cornering, an electric brake system that increases brake force, a brake by wire (BBW), or the like. The brake system 18 applies the brake force to a vehicle wheel to decelerate the vehicle 1 through an actuator (not illustrated). The brake sensor 18a is, for example, a sensor that detects an operation amount of a brake pedal.

The accelerator sensor 19 is a sensor that detects the operation amount of an acceleration pedal. The torque sensor 20a detects torque which is applied to the steering unit by a driver. The shift sensor 21 is, for example, a sensor that detects the position of an actuation unit of a shift operating unit and is constituted by a displacement sensor, and the like. The actuation unit is, for example, a lever, an arm, a button, or the like. Further, constitutions, layouts, electrical connection forms, and the like of various sensors or actuators described above are presented as an example, and may be variously set or changed. The direction indicator 22 outputs signals for indicating turn-on, turn-off, flickering, and the like of a direction indicating light.

An input unit 10a may be provided in the image display system 10. In this case, the input unit 10a is constituted by, for example, a press button, a switch, a handle, and the like.

A monitor device 24 includes the display 24a, the input unit 24b, and a voice output device 24c. The display 24a is, for example, a liquid crystal display (LCD). The voice output device 24c is, for example, a speaker. The input unit 24b is transparent and covers the display 24a. The input unit 24b is, for example, a touch panel, or the like. A user may visually recognize an image displayed on a display screen of the display 24a through the input unit 24b. Further, the user may execute an input through an operation such as touching, pressing, or moving the input unit 24b with a finger, or the like at a position corresponding to the image displayed on the display screen of the display 24a. In addition, the display 24a, the input unit 24b, the voice output device 24c, and the like are installed in, for example, the monitor device 24 positioned at the center of a vehicle width direction, that is, a horizontal direction of a dashboard. The monitor device 24 may have an input unit (not illustrated), such as a switch, a dial, joystick, the press button, or the like. The monitor device 24 is jointly used as a navigation system or an audio system.

The ECU 11 includes, for example, a central processing unit (CPU) 11a, a read only memory (ROM) 11b, a random access memory (RAM) 11c, a flash memory 11d, a display controller 11e, a voice controller 11f, and the like. The flash memory 11d may be a solid state drive (SSD). The CPU 11a may execute various operations. The CPU 11a may read a program installed and stored in a non-volatile memory device such as the ROM 11b or the flash memory 11d and execute an operation processing according to the corresponding program. The RAM 11c temporarily stores various data used for the operation in the CPU 11a. Further, the flash memory 11d may be a rewritable non-volatile memory unit, and even when a power supply of the ECU 11 is turned off, the flash memory 11d may store data. In addition, the display controller 11e may primarily execute a general image processing using the image data acquired by the imaging unit 12 or a general image processing of the image data displayed in the display 24a. Moreover, the voice controller 11f may primarily execute the processing of voice data output from the voice output device 24c. Further, the CPU 11a, the ROM 11b, the RAM 11c, and the like may be integrated in the same package. In addition, the ECU 11 may use another logic operation processor such as a digital signal processor (DSP) or a logic circuit instead of the CPU 11a. Moreover, the ECU 11 may use a hard disk drive (HDD) instead of the flash memory 11d, or the flash memory 11d or the HDD may be provided separately from the ECU 11.

Figure 3:
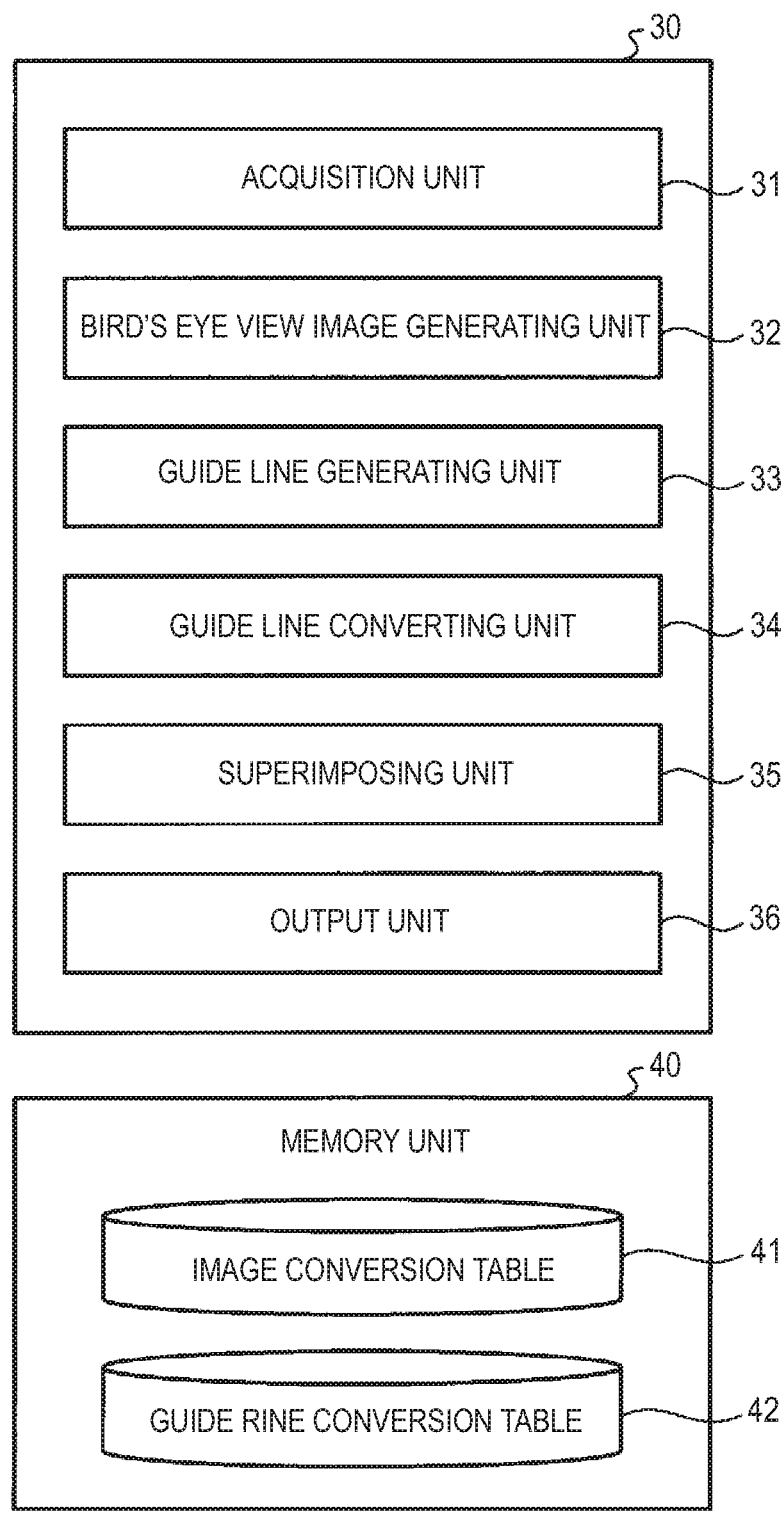
FIG. 3 is an exemplary and schematic block diagram of an ECU according to the first embodiment.

FIG. 3 is an exemplary and schematic block diagram of the ECU 11. The ECU 11 may serve as the image processing device by cooperation with hardware and software (program). As illustrated in FIG. 1, the ECU 11 may include the display controller 11e and the voice controller 11f and as illustrated in FIG. 3, the ECU 11 may include an image processing unit 30 and a memory unit 40. The image processing unit 30 is configured by, for example, the CPU 11a. In this case, the CPU 11a serves as respective units of the image processing unit 30, that is, an acquisition unit 31, a bird's eye view image generating unit 32, a guide line generating unit 33, a guide line converting unit 34, a superimposing unit 35, an output unit 36, and the like. The memory unit 40 includes the ROM 11b, the RAM 11c, and the flash memory 11d. Further, at least a part of the image processing executed by the image processing unit 30 may be executed by the display controller 11e. Each unit of the image processing unit 30 may correspond to a module of the program and at least a part of the image processing unit 30 may be configured as the hardware.

The acquisition unit 31 acquires the captured images of the periphery of the vehicle 1, which are captured by the plural imaging units 12 installed in the vehicle 1.

The memory unit 40 stores an image conversion table 41 for converting the captured image data acquired by the acquisition unit 31 into bird's eye view images projected to a virtual projection plane. Further, the memory unit 40 stores a guide line conversion table 42 for imparting distortion similar to the bird's eye view image in order to superimpose a guide line for guiding the vehicle 1 on the bird's eye view image.

The image conversion table of the embodiment is set as a table for generating bird eye's view image data in which the captured image data seem to have passed through the fish-eye lens. First, bird's eye view image data used in the related art is described.

Figure 4:
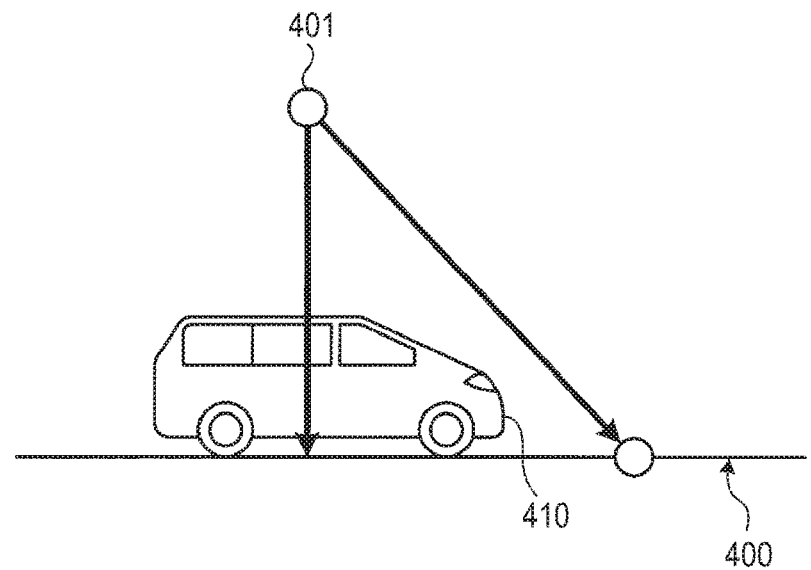
FIG. 4 is a diagram for describing a case where a virtual projection plane is a virtual plane, which is used in the related art.

FIG. 4 is a diagram for describing a case where a virtual projection plane is a virtual plane, which is used in the related art. As illustrated in FIG. 4, when the virtual projection plane is a virtual plane 400, a technique is used, which generates and displays bird's eye view image data referred from a virtual point of view 401 provided above a vehicle 410 in the related art.

Figure 5:
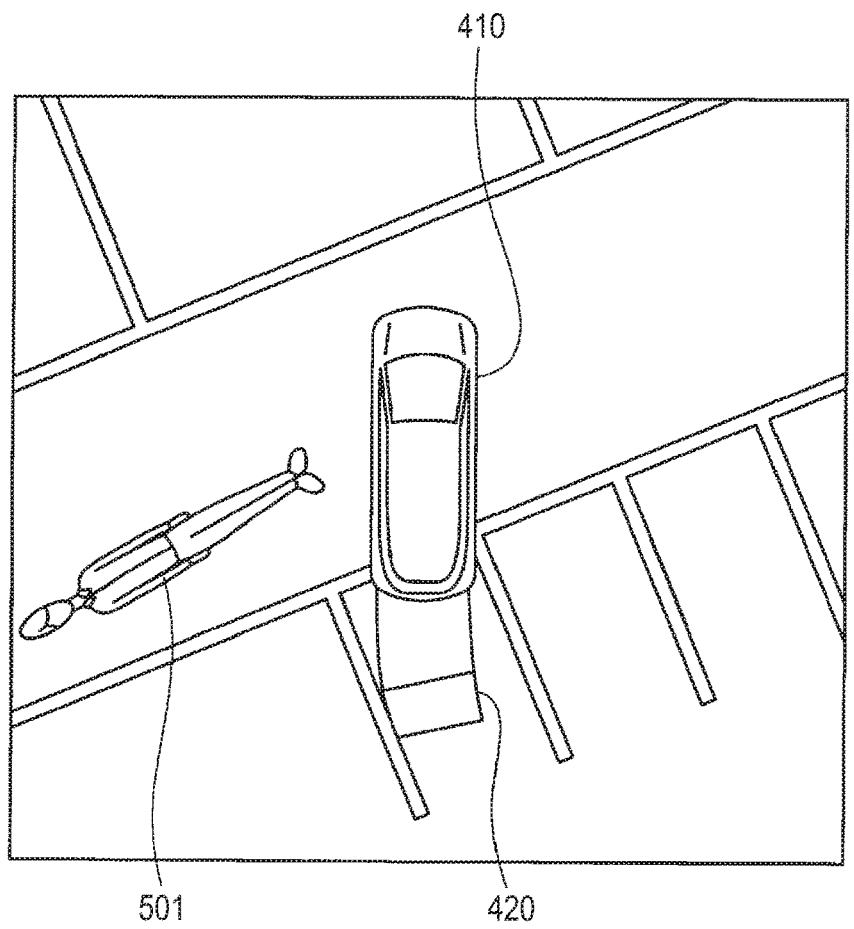
FIG. 5 is a diagram illustrating bird's eye view image data generated in the case where the virtual projection plane is the virtual plane, which is used in the related art.

FIG. 5 is a diagram illustrating the bird's eye view image data generated in the case where the virtual projection plane is the virtual plane, which is used in the related art. In an example illustrated in FIG. 5, straight lines of partition lines are reproduced. Thereon, a guide line 420 indicating a predicted course of the vehicle 410 is also displayed while being superimposed on the bird's eye view image data based on the steering angle of the vehicle 410, and the like. Since the corresponding guide line 420 is also projected onto the virtual plane, the driver may easily recognize the predicted course of the vehicle 410.

Meanwhile, a person (e.g., a child 501) or an object standing around the vehicle 410 is extended. The reason is that like the child 501, a position of the same height as the imaging unit installed in the vehicle 410 is projected at infinity. Therefore, it may be difficult to determine the person or object standing around the vehicle 410 based on the captured image data in some cases.

Figure 6:
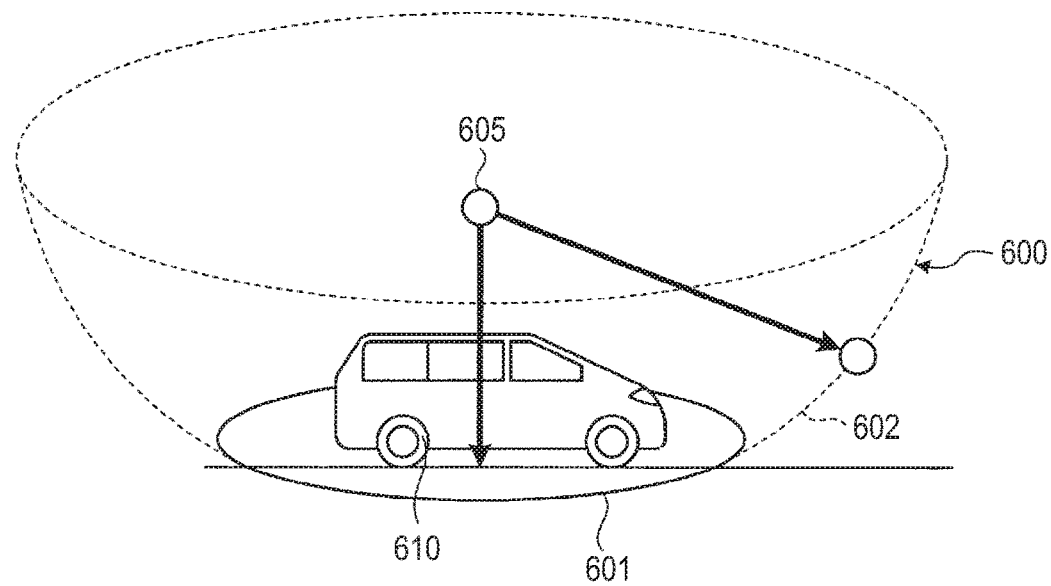
FIG. 6 is a diagram for describing a case where the virtual projection plane has a virtual bowl shape, which is used in the related art.

FIG. 6 is a diagram for describing a case where the virtual projection plane has a virtual bowl shape, which is used in the related art. As illustrated in FIG. 6, when a virtual projection plane 600 has the virtual bowl shape, the virtual projection plane 600 includes a plane portion 601 and a curve portion 602. Then, used is a technique that generates and displays bird's eye view image data referred from a virtual point of view 605 provided above a vehicle 610.

Figure 7:
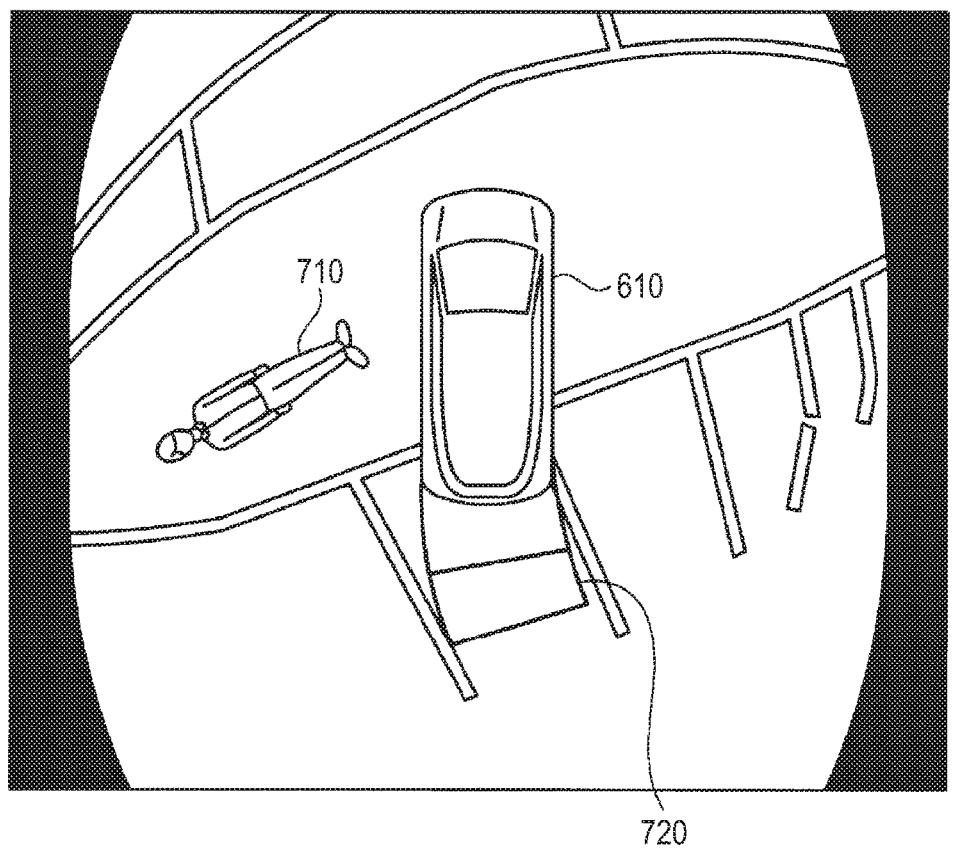
FIG. 7 is a diagram illustrating bird's eye view image data generated in the case where the virtual projection plane has the virtual bowl shape, which is used in the related art.

FIG. 7 is a diagram illustrating the bird's eye view image data generated in the case where the virtual projection plane 600 has the virtual bowl shape, which is used in the related art. In the example illustrated in FIG. 7, since the captured image data is projected to the virtual bowl shape, a person (e.g., a child 710) or an object existing around the vehicle 610 is prevented from being extended, and as a result, it is easy to determine the person or the object.

In the example illustrated in FIG. 7, when the images are captured by the plural imaging units, imaging directions of the plural imaging units which cross each other at a predetermined point deviate from each other at the predetermined point, and as a result, the imaging directions deviate from each other at another place. Therefore, a linear white line on a road surface is distorted to be curved in the middle at a boundary of adjacent imaging units or one white line tends to be bifurcated at the boundary of the adjacent imaging units.

In addition, there is a possibility that a guide line 720 causing the discomfort may be superimposed on the bird's eye view image data. In this case, when the guide line is superimposed in order to guide the vehicle 610 on a road surface, a difference in point of view occurs between the corresponding road surface (plane) and a projection plane disposed in the air of the virtual bowl shape. As a result, an uncomfortable feeling occurs on the guide line by an influence of the corresponding difference in point of view.

Therefore, in the embodiment, the captured image data is projected to the projection plane referred through the fish-eye lens.

Figure 8:
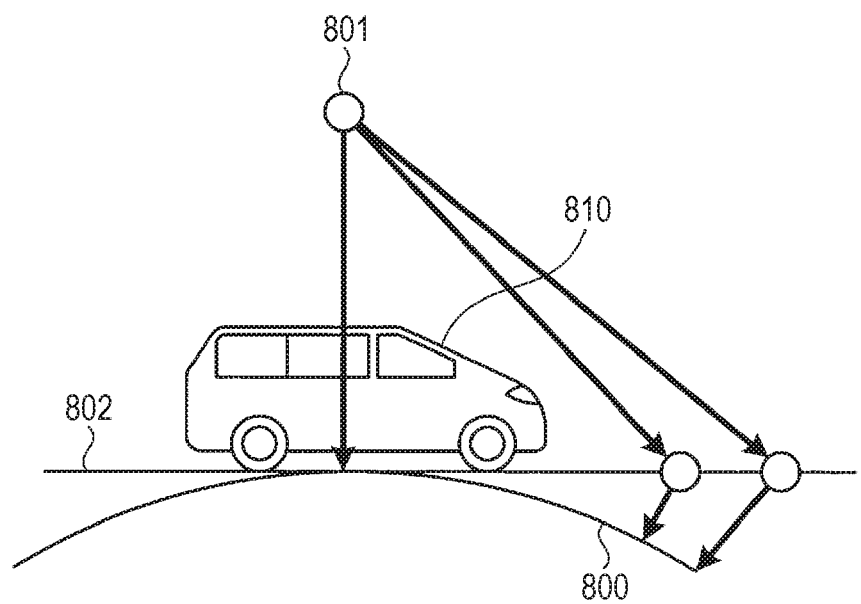
FIG. 8 is a diagram for describing a case where a virtual projection plane has a virtual spherical shape according to the first embodiment.

FIG. 8 is a diagram for describing a case where a virtual projection plane has a virtual spherical shape according to the embodiment. As illustrated in FIG. 8, in the embodiment, a virtual projection plane 800 having a virtual spherical shape generates and displays bird's eye view image data from a virtual point of view 801 of information on a vehicle 810.

In the embodiment, plural captured image data captured by the plural imaging units 12 are not directly projected to the virtual projection plane 800, but the plural captured image data captured by the plurality of imaging units 12 are once projected to a virtual plane 802 and thereafter, the image data projected to the corresponding virtual plane 802 is projected to the virtual projection plane 800. As illustrated in FIGS. 4 and 5, when the captured image data is projected to the virtual plane, the deviation or the difference in point of view of the images by the plural cameras described in FIGS. 6 and 7 does not occur.

Therefore, in the embodiment, the captured image data is once projected to the virtual plane 802 and the captured image data projected to the virtual plane 802 is projected to the virtual projection plane 800 again.

Figure 9:
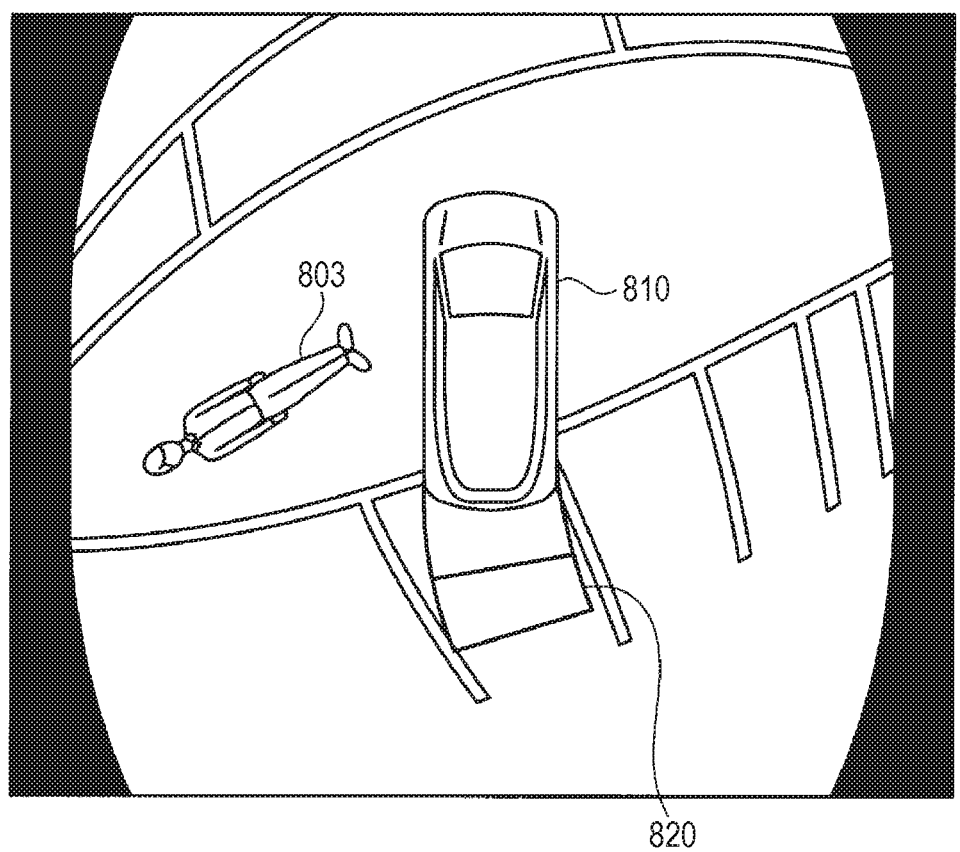
FIG. 9 is a diagram illustrating bird's eye view image data generated in the case where the virtual projection plane is a virtual spherical (curved) shape according to the first embodiment.

FIG. 9 is a diagram illustrating bird's eye view image data generated in the case where the virtual projection plane has the virtual spherical (curved) shape. In the example illustrated in FIG. 9, the captured image data is projected to the virtual plane 802, and the captured image data projected to the virtual plane 802 is projected to the virtual projection plane 800 again. The captured image data passes through the virtual plane 802 so that an uncomfortable feeling due to the deviation or the difference in point of view of the images can be suppressed. Thereafter, the captured image data is projected to the virtual projection plane 800 so that a person (e.g., a child 803) or an object existing around the vehicle 810 is prevented from being extended, and as a result, it is easy to determine the persons or objects.

In the example illustrated in FIG. 9, a processing of projecting a guide line 820 which is superimposed on the virtual plane to the virtual projection plane 800 to suppress an uncomfortable feeling.

Therefore, in the embodiment, an image conversion table is stored in the memory unit 40 to perform conversion for projecting the captured image data to the virtual plane 802, and projecting again the captured image data projected to the virtual plane 802, to the virtual projection plane 800.

Figure 10:
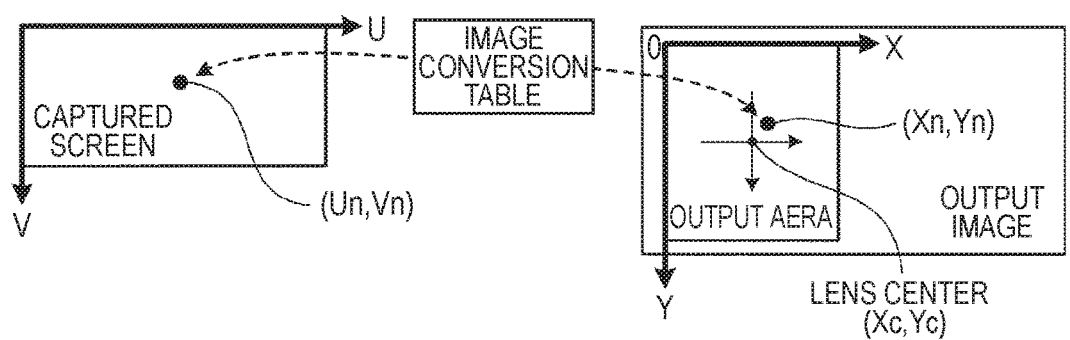
FIG. 10 is a diagram for describing an image conversion table stored in a memory unit according to the first embodiment.

The image conversion table of the embodiment will be described. FIG. 10 is a diagram for describing the image conversion table stored in the memory unit 40. As illustrated in FIG. 10, pixels (coordinates (Un, Vn)) of the captured image data are converted into pixels (coordinates (Xn, Yn)) of output image data by using the image conversion table. Next, a conversion algorithm of the image conversion table will be described. First, a transition from the pixels (coordinates (Xn, Yn)) of the output image data up to the pixels (coordinates (Un, Vn)) of the captured image data will be described. Further, an operation for converting the corresponding image conversion table is not particularly executed by the ECU 11 and any calculation unit may perform the processing.

A calculation unit (not illustrated) converts the pixels (coordinates (Xn, Yn)) of the output image data into coordinates (coordinates (X'n, Y'n)) whose origin is located at the center coordinates (coordinates (Xc, Yc)) of the fish-eye lens. Further, the pixels (coordinates (Xn, Yn)) of the output image data have coordinates whose origin is located at the top left corner in the output area of FIG. 10. The calculation unit calculates the coordinates (coordinates (X'n, Y'n)) whose origin is located at the center coordinates (coordinates (Xc, Yc)) of the fish-eye lens using Equations (1) and (2).

$$X'n = Xn - Xc \quad (1)$$

$$Y'n = Yn - Yc \quad (2)$$

Further, the calculation unit calculates a distance y of a pixel of an output image data from the center of a lens using Equation (3).

$$y = \operatorname{sqrt}((X'n \times X'n) + (Y'n \times Y'n)) \quad (3)$$

In the embodiment, a case where the fish-eye lens is in an orthogonal projection is described. In the case of the orthogonal projection, the following Equation (4) is established. Further, it is assumed that an angle (incident angle) of a subject side from an optical axis is represented by θ, a distance (actual image height) from the center of an image side (after converted by the fish-eye lens) is y, and a focal distance is f.

$$y = f \times \sin \theta \quad (4)$$

Therefore, the incident angle θ may be expressed by Equation (5).

$$\theta = a \sin (y/f) \quad (5)$$

Figure 11:
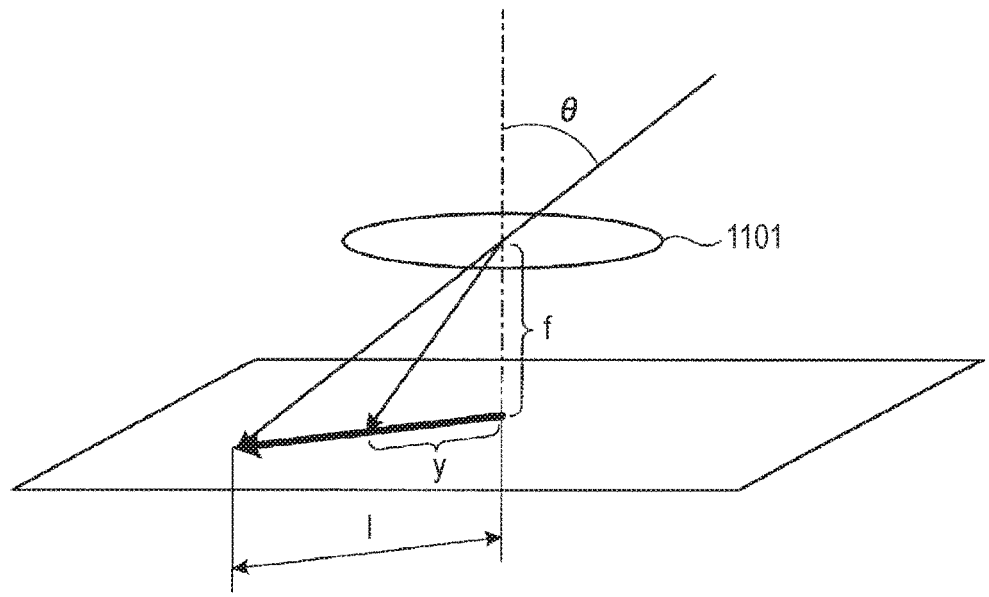
FIG. 11 is a diagram illustrating a relationship between an ideal image height and an actual image height.

FIG. 11 is a diagram illustrating the relationship between an ideal image height l and the actual image height y. As illustrated in FIG. 11, the ideal image height l represents a distance from the center when being not converted by a fish-eye lens 1101 on a plane spaced apart from the fish-eye lens by the focal distance f and the actual image height y represents a distance from the center when being converted by the fish-eye lens on the plane spaced apart from the fish-eye lens 1101 by the focal distance f. As illustrated in FIG. 11, the ideal image height l may be calculated from the incident angle θ using Equation (6).

$$l = f \times \tan \theta \quad (6)$$

A magnification rate a which sets the actual image height y to be the ideal image height l may be expressed by Equation (7).

$$\alpha = l/y \quad (7)$$

In addition, the calculation unit converts the coordinates (coordinates (X'n, Y'n)) by the actual image height into coordinates (coordinates (X"n, Y"n)) by the ideal image height using Equations (8) and (9).

$$X''n = X'n \times \alpha \quad (8)$$

$$Y''n = Y'n \times \alpha \quad (9)$$

The coordinates (coordinates (X"n, Y"n)) by the ideal image height l represent the coordinates on the virtual plane when the image does not pass through the fish-eye lens. In other words, the processing of Equations (8) and (9) represents that the coordinates projected to the virtual curved surface are converted into the coordinates projected to the virtual plane.

Figure 12:
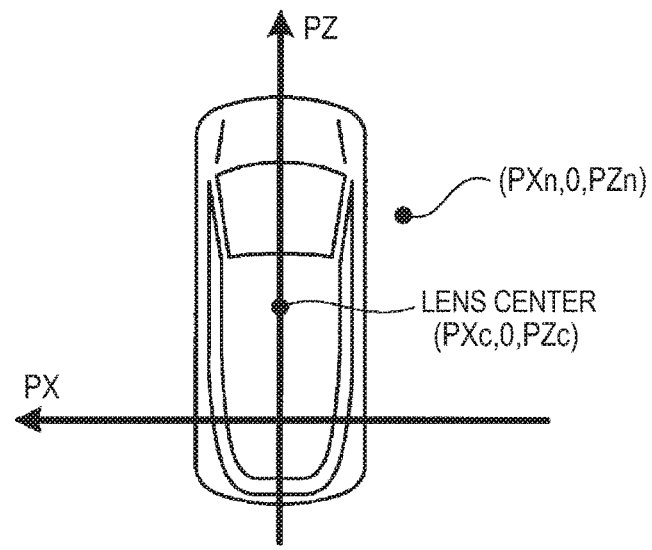
FIG. 12 is a diagram illustrating an actual position on a road surface.

FIG. 12 is a diagram illustrating an actual position on a road surface. As illustrated in FIG. 12, the position on the road surface is set to a coordinate system (PX axis, PZ axis) whose center is located at a lens center (PXc, 0, PZc).

In the embodiment, the calculation unit converts the coordinates (coordinates X"n, Y"n) by the ideal image height into a position (PXn, 0, PZn) on the road surface illustrated in FIG. 12 based on a scale Scale representing a distance difference between the actual image height y and the road surface. The following Equations (10) and (11) below are used for the corresponding conversion.

$$PXn = -X''n \times \text{Scale} + PXn \quad (10)$$

$$PZn = -Y''n \times \text{Scale} + PZn \quad (11)$$

The calculation unit projects and converts the position (PXn, 0, PZn) on the road surface onto the captured image of the imaging device to derive the pixels (coordinates (Un, Vn)) of the captured image data. Further, a technique in the related art may be used for a projection conversion method to the imaging unit 12 and a description of the technique is omitted.

The calculation unit performs the processing to derive a correspondence relationship between the pixels (coordinates (Un, Vn)) of the captured image data and the pixels (coordinates (Xn, Yn)) of the output image data. The image conversion table of the embodiment stores the corresponding correspondence relationship. Further, based on this, the embodiment may convert the pixels (coordinates (Un, Vn)) of the captured image data into the pixels (coordinates (Xn, Yn)) of the output image data of the fish-eye lens shape of the orthogonal projection. In addition, the embodiment converts the pixels (coordinates (Un, Vn)) of the captured image data into the pixels (coordinates (Xn, Yn)) of the output image data, rather than actually generating or using image data generated in the middle by the coordinates (coordinates (X"n, Y"n) by the ideal image height or the coordinates (coordinates (X'n, Y'n) by the actual image height.

Next, the guide line conversion table 42 is described. First, the calculation unit converts a trajectory point (PXm, 0, PZm) on the road surface indicated by the guide line into coordinates (PX'm, 0, PZ'm) whose origin is located at the lens center (PXc, 0, PZc) using Equations (12) and (13).

$$PX'm = PXm - PXc \quad (12)$$

$$PZ'm = PZm - PZc \quad (13)$$

Further, the calculation unit converts the trajectory point (PXm, 0, PZm) on the road surface into coordinates (coordinates (X"m, Y"m)) by the ideal image height on the display screen using Equations (14) and (15).

$$X''m = -PX'm/\text{Scale} \quad (14)$$

$$Y''m = -PZ'm/\text{Scale} \quad (15)$$

An ideal image height Im from coordinates (coordinates (X"m, Y"m)) by the ideal image height on the display screen may be acquired from Equation (16).

$$Im = \text{sqrt}((X''m \times X''m) + (Y''m \times Y''m)) \quad (16)$$

Further, an incident angle Om may be derived using the following Equation (17). Further, the focal distance f is the same as a value used by the image conversion table 41.

$$\theta m = a\tan(Im/f) \quad (17)$$

Since the fish-eye lens is similar to the image conversion table 41, Equation (18) is established. Further, an actual image height is represented by ym.

$$ym = f \times \sin\theta m \quad (18)$$

A reduction rate β which sets the ideal image height Im to be the actual image height ym may be expressed by Equation (19).

$$\beta = ym/Im \quad (19)$$

The calculation unit converts the coordinates (coordinates (X"m, Y"m)) by the ideal image height into coordinates (coordinates (X'm, Y'm)) by the actual image height by using Equations (20) and (21), in other words, the reduction rate β.

$$X'm = X''m \times \beta \quad (20)$$

$$Y'm = Y''m \times \beta \quad (21)$$

The calculation unit adds the lens center coordinates (Xc, Yc) of the fish-eye lens to the coordinates (coordinates (X'm, Y'm)) by the actual image height to convert the coordinates (coordinates (X'm, Y'm)) by the actual image height into coordinates (Xm, Ym) whose origin is located at the left top corner on the output area, using Equations (22) and (23).

$$Xm = X'm + Xc \quad (22)$$

$$Ym = Y'm + Yc \quad (23)$$

The calculation unit performs the processing to derive the correspondence relationship between the trajectory point (PXm, 0, PZm) on the road surface of the guide line and the coordinate values (coordinates (Xm, Ym)) of the output image data. The guide line conversion table of the embodiment stores the corresponding correspondence relationship. As a result, a trajectory of the guide line for guiding the vehicle 1 may be converted into the trajectory of a virtual guide line on the output image data.

Referring back to FIG. 3, the bird's eye view image generating unit 32 generates bird's eye view image data of a fish-eye lens shape based on the virtual point of view by converting the captured image data acquired by the acquisition unit 31 using the image conversion table 41. In the embodiment, an example of generating a bird's eye view image of a fish-eye lens shape is described, but the bird's eye view image is not limited to the bird's eye view image of the fish-eye lens shape and may be a bird's eye view image of a virtual lens shape. For example, a bird's eye view image of a wide-angle virtual lens shape is considered.

The values of the image conversion table 41 need not have the corresponding relationship for all pixels and the captured image data are cut out for each triangle and the values of the image conversion table 41 may have the correspondence relationship with respective apexes of the triangle.

Figure 13:
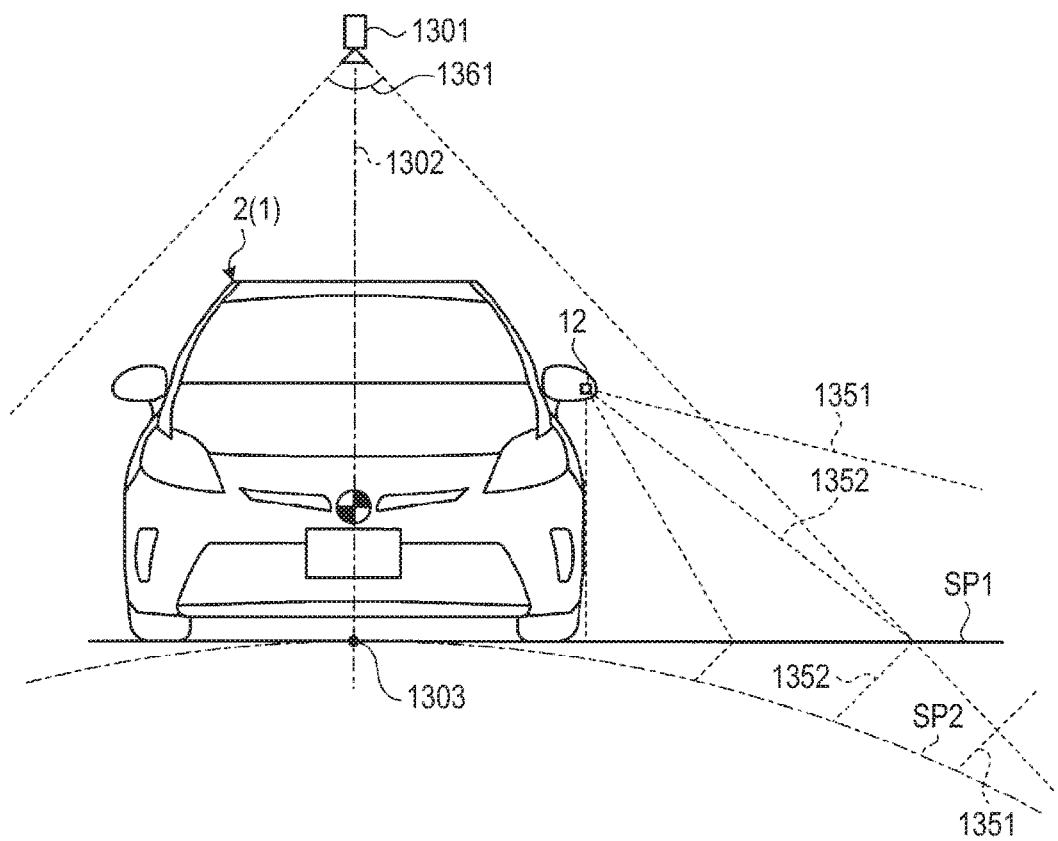
FIG. 13 is an explanatory diagram illustrating an aspect in which image data captured by an imaging unit is projected to a virtual curved surface.

FIG. 13 is an explanatory diagram illustrating the projection of image data captured by the imaging unit 12 to a virtual curved surface (virtual projection plane). As illustrated in FIG. 13, the image conversion table 41 performs the conversion based on the correspondence relationship. The bird's eye view image generating unit 32 generates bird's eye view image data of a fish-eye lens shape in which the captured image data is projected to a virtual plane SP1 corresponding to the ground and the captured image data projected to the virtual plane SP1 is also projected to a virtual curved surface SP2 by using the image conversion table 41.

The virtual plane SP1 is a horizontal plane orthogonal to a vertical direction Y of the vehicle 1 and corresponds to the ground with which a tire is brought into contact. The virtual curved surface SP2 represents a virtual spherical-shaped 3D virtual projection plane provided at a side opposite to the vehicle 1 with reference to the ground and separated from the ground with distance from the vehicle 1. The virtual curved surface SP2 is in contact with the virtual plane SP1 at a point 1303 existing on an extension line in an imaging direction 1302 of an imaging unit 1301. In the embodiment, an example of projecting the captured image data to the spherical virtual curved surface SP2 is described, but the virtual curved surface is not limited to the virtual spherical shape and the virtual curved surface may have an aspheric shape.

Within a viewing angle 1361 of the imaging unit 1301, only a range indicated by a line 1352 may be displayed on the virtual plane SP1, but a range larger than a range indicated by a line 1351 may be displayed on the virtual plane SP2. As described above, bird's eye view image data of the fish-eye lens type is generated to verify the larger range.

In the embodiment, the captured image data is projected to the virtual curved surface SP2 after passing through the virtual plane SP1. As a result, in the generated bird's eye view image data, a straight line may be prevented from being curved in the middle or the line may be prevented from being branched in the middle at the boundary of the plurality of imaging units.

The guide line generating unit 33 generates a guide line that indicates the predicted course of the vehicle 1 based on the steering angle of the vehicle 1.

The guide line converting unit 34 converts the guide line generated by the guide line generating unit 33 into a virtual guide line that indicates the predicted course of the vehicle 1 on the spherical-shaped virtual projection plane (virtual curved surface) SP2 using the guide line conversion table 42.

The superimposing unit 35 superimposes the virtual guide line on the bird's eye view image data of the fish-eye lens shape. In the embodiment, since the difference in point of view does not occur, an uncomfortable feeling may be prevented compared with the case where the virtual guide line is superimposed on the virtual projection plane having the virtual bowl shape, which is used in the related art.

The output unit 36 outputs, to the display 24a, bird's eye view image data of the fish-eye lens shape on which the virtual guide line is superimposed.

Next, a processing until the bird's eye view image data is output in the ECU 11 in the embodiment will be described.

Figure 14:
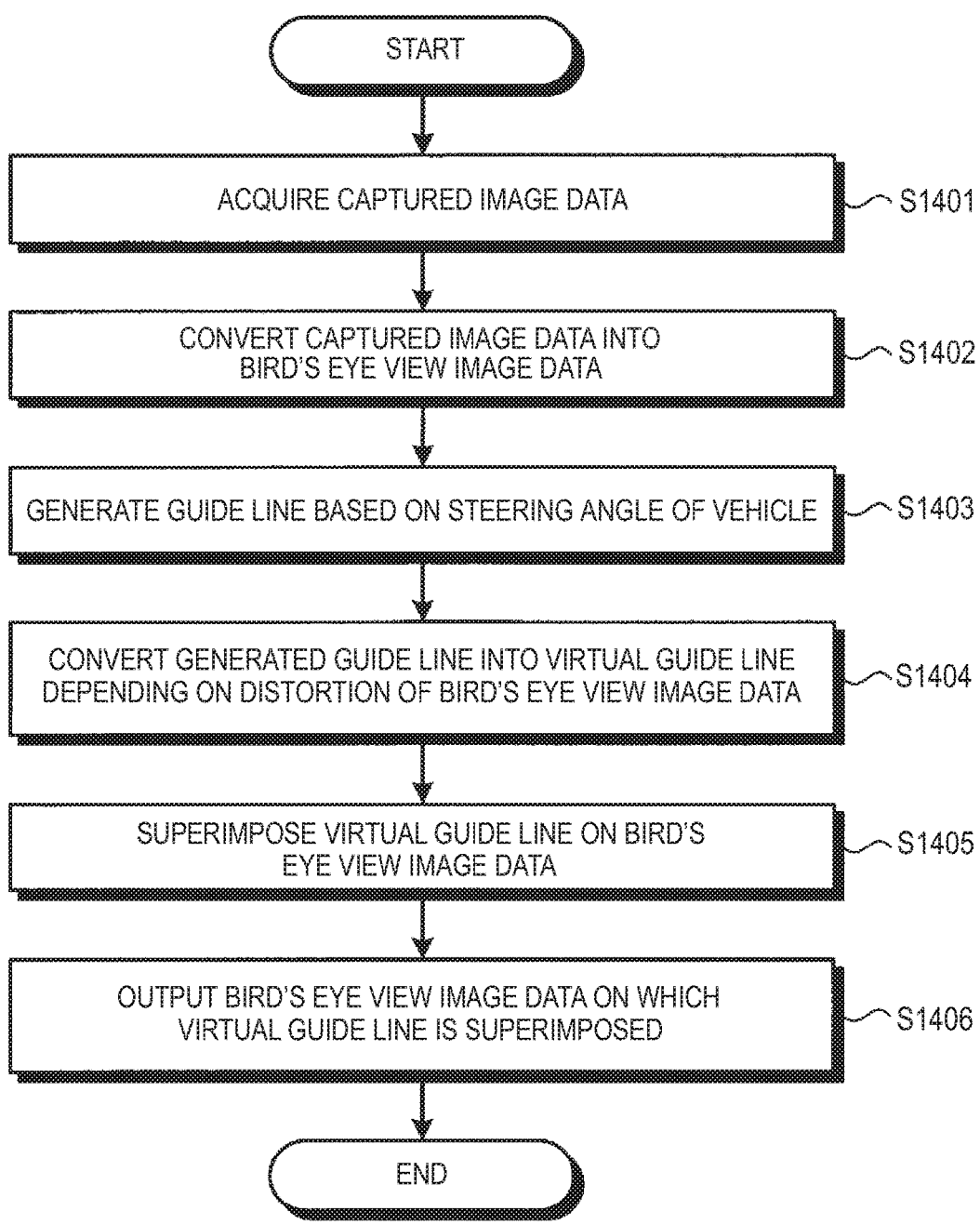
FIG. 14 is a flowchart illustrating an order of the processing until the bird's eye view image data is output by the ECU in the first embodiment.

FIG. 14 is a flowchart illustrating an order of the processing in the ECU 11 of the embodiment.

First, the acquisition unit 31 acquires the captured image data of the periphery of the vehicle 1, which are captured by the plurality of imaging units 12 (S1401).

Next, the bird's eye view image generating unit 32 converts the captured image data into the bird's eye view image data using the image conversion table 41 (S1402).

Next, the guide line generating unit 33 generates a guide line based on the steering angle of the vehicle 1 (S1403).

The guide line converting unit 34 converts the generated guide line into a virtual guide line depending on the distortion of the bird's eye view image data using the guide line conversion table 42 (S1404).

The superimposing unit 35 superimposes the virtual guide line on the bird's eye view image data (S1405).

The output unit 36 outputs, to the display 24a, the bird's eye view image data of the fish-eye lens shape on which the virtual guide line is superimposed (S1406).

According to the embodiment, with the above-described configuration, it is possible to superimpose a suitable virtual guide line on the bird's eye view image data. As a result, the predicted course of the vehicle 1 may be recognized even with the bird's eye view image data of the fish-eye lens shape.

(Second Embodiment)

In the first embodiment, the case where a pattern of the fish-eye lens is only one type has been described. However, the pattern of the fish-eye lens (virtual lens) is not limited to one type and the user may arbitrarily select the pattern of the fish-eye lens from plural types. Therefore, in the second embodiment, descriptions will be made with reference to the case where the pattern of the fish-eye lens may be selected from the plural types.

Figure 15:
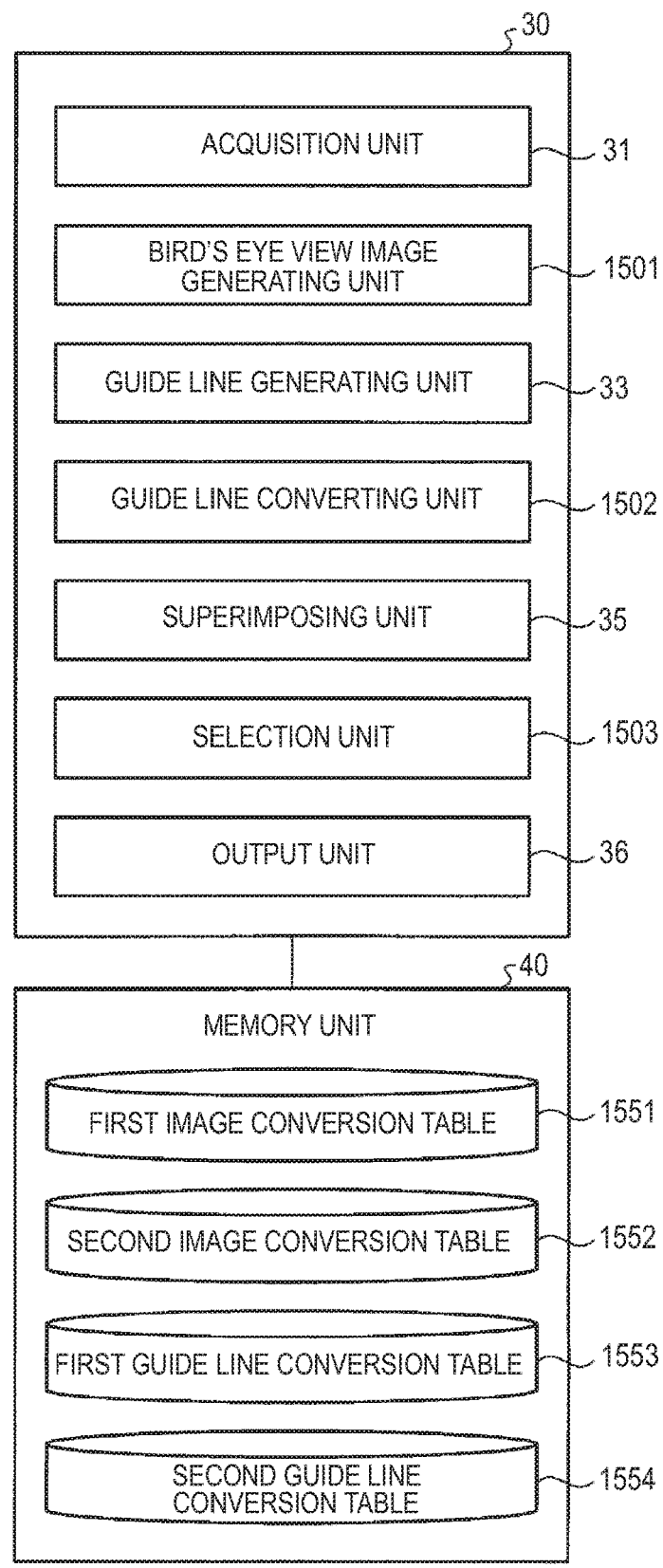
FIG. 15 is an exemplary and schematic block diagram of an ECU according to a second embodiment.

FIG. 15 is an exemplary and schematic block diagram of the ECU 11 according to a second embodiment. The ECU 11 may serve as the image processing device by cooperation with hardware or software (program). In this case, the CPU 11a serves as respective units of the image processing unit 30, that is, the acquisition unit 31, a bird's eye-bird image generating unit 1501, the guide line generating unit 33, a guide line converting unit 1502, the superimposing unit 35, a selection unit 1503, the output unit 36, and the like.

The memory unit 40 stores a first image conversion table 1551, a second image conversion table 1552, a first guide line conversion table 1553, and a second guide line conversion table 1554.

The first image conversion table 1551 is set as a table that converts pixels (coordinates (Un, Vn)) of captured image data into pixels (coordinates (Xn, Yn)) of output image data of the fish-eye lens shape of an orthogonal projection, like the image conversion table 41.

The second image conversion table 1552 is set as a table that converts pixels (coordinates (Un, Vn)) of captured image data into pixels (coordinates (X'''n, Y'''n)) of output image data of the fish-eye lens shape of an equal solid angle projection.

The second image conversion table 1552 is set as a conversion table using an equal solid angle projection $y=2 \times f \times \sin(\theta/2)$ instead of the orthogonal projection $y=f \times \sin\theta$ illustrated in the first embodiment. Further, the other one is similar to the first embodiment.

The first guide line conversion table 1553 is set as a conversion table for generating a guide line superimposed on the output image data of the fish-eye lens shape of the orthogonal projection like the guide line conversion table 42 of the first embodiment.

The second guide line conversion table 1554 is set as a conversion table for generating a guide line superimposed on the output image data of the fish-eye lens shape of the equal solid angle projection. The second guide line conversion table 1554 is set as a conversion table using the equal solid angle projection $y=2 \times f \times \sin(\theta/2)$ instead of the orthogonal projection $y=f \times \sin\theta$ illustrated in the first embodiment. Further, the other one is similar to the first embodiment.

The selection unit 1503 selects any one of the fish-eye lens of the orthogonal projection and the fish-eye lens of the equal solid angle projection to be used according to an operation from the driver through the input unit 10a when converting the bird's eye view image data displayed in the display 24a.

The bird's eye view image generating unit 1501 generates a bird's eye view image of a fish-eye lens shape based on any one of the plural conversion techniques depending on the type of the fish-eye lens.

The bird's eye view image generating unit 1501 of the embodiment converts captured image data into bird's eye view image data using the first image conversion table 1551 when the fish-eye lens of the orthogonal projection is selected by the selection unit 1503. Further, the bird's eye view image generating unit 1501 converts captured image data into bird's eye view image data using the second image conversion table 1552 when the fish-eye lens of the equal solid angle projection is selected by the selection unit 1503.

The guide line converting unit 1502 converts a guide line into a virtual guide line depending on the bird's eye view image of the fish-eye lens shape based on any one of the plurality of conversion techniques depending on the type of the fish-eye lens.

The guide line converting unit 1502 of the first embodiment converts the guide line into the virtual guide line (on the road surface converted into the fish-eye lens shape of the orthogonal projection) using the first guide line conversion table 1553 when the fish-eye lens of the orthogonal projection is selected by the selection unit 1503. Further, the bird's eye view image generating unit 1501 converts the guide line into the virtual guide line (on the road surface converted into the fish-eye lens shape of the equal solid angle projection) using the second guide line conversion table 1554 when the fish-eye lens of the equal solid angle projection is selected by the selection unit 1503.

The superimposing unit 35 superimposes the virtual guide line converted by the guide line converting unit 1502 on the bird's eye view image data converted by the bird's eye view image generating unit 1501 as described in the first embodiment.

Figure 16:
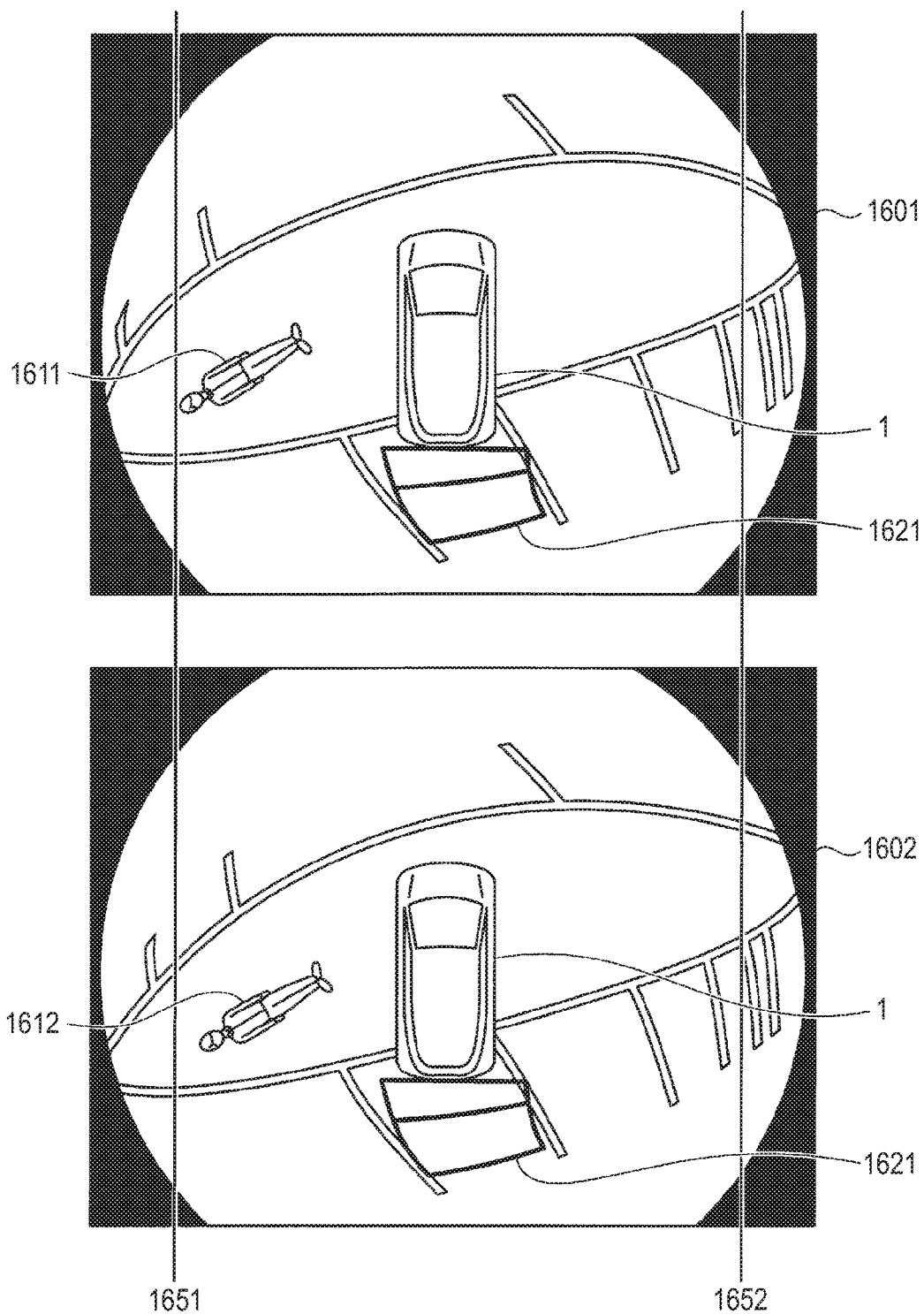
FIG. 16 is a diagram illustrating bird's eye view image data converted into a fish-eye lens shape of an orthogonal projection and bird's eye view image data converted into a fish-eye lens shape of an equal solid angle projection.

FIG. 16 is a diagram illustrating bird's eye view image data 1601 converted into a fish-eye lens shape of an orthogonal projection and bird's eye view image data 1602 converted into a fish-eye lens shape of an equal solid angle projection. In the example illustrated in FIG. 16, the vehicle 1 and a guide line 1621 are represented.

As illustrated in FIG. 16, in the bird's eye view image data 1601, a person 1611 is in contact with a reference line 1651 and the end of a white line is in contact with a reference line 1652.

In this regard, in the bird's eye view image data 1602, a person 1612 is represented at the center side from the reference line 1651 and the end of the white line is represented in at the center side from the reference line 1652.

That is, in the bird's eye view image data 1601 converted into the fish-eye lens shape of the orthogonal projection, the periphery of the vehicle 1 is widely represented. In this regard, in the bird's eye view image data 1602 converted into the fish-eye lens shape of the equal solid angle projection, a wider range is displayed than that of the bird's eye view image data 1601. As described above, the driver may select the displayed bird's eye view image data. In the embodiment, since the driver may select the display according to the situation, it is easy for the driver to determine the surrounding.

In the embodiment, descriptions have been made with reference to the case where the bird's eye view image data is selected from the fish-eye lens shape of the orthogonal projection and the fish-eye lens shape of the equal solid angle projection. However, without being limited thereto, for example, bird's eye view image data of the fish-eye lens shape of an equal distance projection or the fish-eye lens shape of a stereoscopic projection may be made to be selectable.

As described above, according to the above-described embodiment, it is possible to implement a display in which no failure occurs even on a boundary of the imaging unit while inhibiting a peripheral object from being extended by displaying bird's eye view image data of the fish-eye lens shape. Further, the virtual guide line is converted according to the bird's eye view image data of the fish-eye lens shape to prevent an uncomfortable feeling on the virtual guide line compared with the technology that projects the bird's eye view image data to the projection plane having the bowl shape in the related art. As a result, the peripheral situation is more easily recognized.

In the embodiment, descriptions has been made on the example of selecting the bird's eye view image data from the bird's eye view image data of the fish-eye lens shape. However, without being limited thereto bird's eye view image data of a virtual lens shape may be made to be selectable.

Although several embodiments disclosed here have been described, but the embodiments are presented as an example and are not intended to limit the scope disclosed here. The new embodiments may be implemented as various other forms and various omission, substitutions, and changes of the embodiments can be made without departing from the gist disclosed here. The embodiments or the modifications thereof are included in the scope or the gist disclosed here, and included in a scope equivalent to the embodiment disclosed herein, which is disclosed in the range of the claims.

An image processing device for a vehicle according to an aspect of this disclosure includes: an acquisition unit that acquires a captured image of a periphery of a vehicle, which is captured by an imaging unit provided in the vehicle; a bird's eye view image generating unit that generates a bird's eye view image in which the captured image is projected to a 3-dimensional ("3D") virtual projection plane that is provided at a side opposite to the vehicle with reference to a ground and separated from the ground with distance from the vehicle; a guide line generating unit that generates a guide line that indicates a predicted course of the vehicle; a conversion unit that converts the guide line into a virtual guide line that indicates the predicted course of the vehicle on the virtual projection plane; and a superimposing unit that superimposes the virtual guide line on the bird's eye view image. Accordingly, a standing object may be inhibited from being extended and an uncomfortable feeling of the guide line may be inhibited, for example, by using the bird's eye view image in which the captured image is projected to the 3D virtual projection plane that is provided at a side opposite to the vehicle with reference to the ground and separated from the ground with distance from the vehicle, and as a result, a peripheral situation may be more easily recognized.

In the image processing device for a vehicle according to the aspect of this disclosure, for example, the bird's eye view image generating unit may generate a bird's eye view image of a virtual lens shape in which the captured image is projected to the virtual projection plane through a virtual plane corresponding to the ground. With this configuration, for example, before projecting the captured image to the 3D virtual projection plane having a virtual spherical shape, the captured image is projected to the virtual plane, so that a failure may be inhibited from occurring in displaying the periphery of the vehicle.

In the image processing device for a vehicle according to the aspect of this disclosure, the bird's eye view image generating unit may generate the bird's eye view image of the virtual lens type based on any one of plural conversion techniques depending on a kind of the virtual lens. With this configuration, for example, since a display according to a situation is enabled, the peripheral situation of the vehicle may be easily recognized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image processing device for a vehicle, comprising:
an electronic control unit configured to
acquire a captured image of a periphery of a vehicle;
generate a bird's eye view image in which the captured image is projected to a 3D virtual projection plane, the vehicle and the 3D virtual projection plane being provided at opposite sides of a ground with which a tire of the vehicle is in contact, and the 3D virtual projection plane extends under the ground away from the vehicle;
generate a guide line that indicates a predicted course of the vehicle;
convert the guide line into a virtual guide line indicating the predicted course of the vehicle on the virtual projection plane; and
superimpose the virtual guide line on the bird's eye view image.

2. The image processing device for a vehicle according to claim 1, wherein the electronic control unit is configured to generate a bird's eye view image of a virtual lens shape in which the captured image is projected to the virtual projection plane through a virtual plane corresponding to the ground.

3. The image processing device for a vehicle according to claim 1, wherein electronic control unit is configured to generate a bird's eye view image of a virtual lens type based on any one of a plurality of conversion techniques depending on a kind of a virtual lens.

4. An image processing method for a vehicle, comprising:
acquiring a captured image of a periphery of a vehicle;
generating a bird's eye view image in which the captured image is projected to a 3D virtual projection plane, the vehicle and the 3D virtual projection plane being provided at opposite sides of a ground with which a tire of the vehicle in contact, and the 3D virtual projection plane extends under the ground away from the vehicle;

generating a guide line that indicates a predicted course of the vehicle;

converting the guide line into a virtual guide line indicating the predicted course of the vehicle on the virtual projection plane; and superimposing the virtual guide line on the bird's eye view image.

5. The image processing method for a vehicle according to claim 4, wherein a bird's eye view image of a virtual lens shape, in which the captured image is projected to the virtual projection plane through a virtual plane corresponding to the ground, is generated.

6. The image processing method for a vehicle according to claim 4, wherein a bird's eye view image of a virtual lens type, based on any one of a plurality of conversion techniques depending on a kind of a virtual lens, is generated.

* * * * *